US012701419B2

(12) United States Patent
Comak et al.

(10) Patent No.: US 12,701,419 B2
(45) Date of Patent: Aug. 4, 2026

(54) UNTRUSTED DATA COLLECTION COORDINATION FUNCTION

(71) Applicant: TELEFONAKTIEBOLAGET LM ERICSSON (PUBL), Stockholm (SE)

(72) Inventors: Pinar Comak, Ankara (TR); Christine Jost, Dalby (SE); Ferhat Karakoc, Istanbul (TR); Stefan Håkansson, Gothenburg (SE); Ulf Mattsson, Kungsbacka (SE); Zhang Fu, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 168 days.

(21) Appl. No.: 18/290,248

(22) PCT Filed: Mar. 15, 2022

(86) PCT No.: PCT/IB2022/052350
§ 371 (c)(1),
(2) Date: Nov. 10, 2023

(87) PCT Pub. No.: WO2022/238771
PCT Pub. Date: Nov. 17, 2022

(65) Prior Publication Data
US 2024/0244434 A1 Jul. 18, 2024

Related U.S. Application Data

(60) Provisional application No. 63/186,666, filed on May 10, 2021.

(51) Int. Cl.
*H04L 29/00* (2006.01)
*H04W 12/033* (2021.01)
(Continued)

(52) U.S. Cl.
CPC ....... *H04W 12/106* (2021.01); *H04W 12/033* (2021.01); *H04W 12/0431* (2021.01); *H04W 12/084* (2021.01); *H04W 12/108* (2021.01)

(58) Field of Classification Search
CPC ............ H04W 12/106; H04W 12/084; H04W 12/108; H04W 12/0431; H04W 12/033
(Continued)

(56) References Cited

U.S. PATENT DOCUMENTS

| | | | | |
|---|---|---|---|---|
| 2008/0301445 A1* | 12/2008 | Vasic | ...................... | G06F 16/10 |
| | | | | 713/171 |
| 2020/0244728 A1* | 7/2020 | Jha | ........................... | H04L 9/30 |
| 2021/0022024 A1* | 1/2021 | Yao | ....................... | H04W 24/08 |

OTHER PUBLICATIONS

3GPP TR 23.700-91 V1.2.0, "3rd Generation Partnership Project; Technical Specification Group Services and System Aspects; Study on enablers for network automation for the 5G System (5GS); Phase 2 (Release 17)", TR 23.700-91 V1.2.0, Nov. 2020.
(Continued)

*Primary Examiner* — Jeffrey C Pwu
*Assistant Examiner* — Michael D Anderson
(74) *Attorney, Agent, or Firm* — Baker Botts L.L.P.

(57) ABSTRACT

A data collection coordination function, DCCF, network node receives (1a) a request for data from a data consumer, determines (2) a data source for the requested data, verifies (3a, 3b) with a network node that the data consumer and the DCCF are authorized by the data source, receives (3b) a message container for the data consumer from the network node, the message container for the data consumer including a data encryption key $K_E$ and a data integrity key Ki, and receives (3b) a message container for the data source from the network node, the message container for the data source including the data encryption key $K_E$ and the data integrity key Ki. The DCCF network node transmits (4a) the message
(Continued)

container for the data consumer to the data consumer and transmits (5) the message container for the data source to the data source.

10 Claims, 12 Drawing Sheets

(51) Int. Cl.
    *H04W 12/0431*    (2021.01)
    *H04W 12/084*    (2021.01)
    *H04W 12/106*    (2021.01)
    *H04W 12/108*    (2021.01)
(58) Field of Classification Search
    USPC ....................................................... 713/159
    See application file for complete search history.

(56) References Cited

OTHER PUBLICATIONS

3GPP TR 23.700-91 v17.0.0, "3rd Generation Partnership Project; Technical Specification Group Services and System Aspects; Study on enablers for network automation for the 5G System (5GS); Phase 2 (Release 17)", 3GPP TR 23.700-91 v17.0.0, Dec. 2020.

3GPP TR 33.866 V0.4.0, 3rd Generation Partnership Project; Technical Specification Group Services and System Aspects; Study on security aspects of enablers for Network Automation (eNA) for the 5G system (5GS) Phase 2; (Release 17), 3GPP TR 33.866 V0.4.0, Mar. 2021.

3GPP TR 38.801 V14.0.0, "3rd Generation Partnership Project; Technical Specification Group Radio Access Network; Study on new radio access technology: Radio access architecture and interfaces (Release 14)", Mar. 2017, pp. 1-91.

3GPP TS 23.502 V16.7.0, "3rd Generation Partnership Project; Technical Specification Group Services and System Aspects; Procedures for the 5G System (5GS); Stage 2 (Release 16)", 3GPP TS 23.502 V16.7.0, Dec. 2020.

3GPP TS 33.501 V17.1.0, "3rd Generation Partnership Project; Technical Specification Group Services and System Aspects; Security architecture and procedures for 5G system, (Release 17)", 3GPP TS 33.501 V17.1.0, Mar. 2021.

3GPP TS 33.501, "3rd Generation Partnership Project; Technical Specification Group Services and System Aspects; Security architecture and procedures for 5G system (Release 17)", V17.0.0, Dec. 2020, 253 pages.

3GPP TS 38.401 V15.6.0,, "3rd Generation Partnership Project; Technical Specification Group Radio Access Network; NG-RAN; Architecture description (Release 15)", 3GPP TS 38.401 V15.6.0, Jul. 2019.

Ericsson, "Removal of token validation by NRF", 3GPP SA WG3 Meeting #92, S3-182383, Aug. 20-24, 2018, Dallan, CN.

Ericsson, "Solution for untrusted DCCF for secure data collection", 3GPP TSG-SA3 Meeting #103-e, S3-212060, e-meeting, May 17-29, 2021.

Oppo, "KI#11, New Solution Consumer authorization for data collection from DCCF", SA WG2 Meeting #140E, S2-2005564, Aug. 19-Sep. 1, 2020, Elbonia.

* cited by examiner

UNTRUSTED DATA COLLECTION COORDINATION FUNCTION

PRIORITY CLAIM

This application is a national stage application of International Patent Application No. PCT/IB2022/052350, filed Mar. 15, 2022, which claims priority to U.S. Provisional Patent Application No. 63/186,666, May 10, 2021, the disclosure disclosures of which are hereby incorporated in their entirety by reference.

TECHNICAL FIELD

The disclosed embodiments relate generally to telecommunications. Some embodiments relate more specifically to a Data Collection Coordination Function (DCCF) for a 5G system (5GS).

BACKGROUND

Third Generation Partnership Project (3GPP) fifth generation (5G) wireless networks include features for data collection. For instance, TR 23.700-091 defines a DCCF for efficient data collection in a 5GS.

FIG. 1 illustrates an example Data Management Framework for a 5G Core (5GC) network.

Referring to FIG. 1, the Data Management Framework comprises a DCCF, an optional DCCF Adaptor (DA), and a Messaging Framework for Data Forwarding and Replication with optional Consumer and Producer Adaptors (3CA and 3PA) to isolate the Messaging Framework protocol from a Data Source and Data Consumer.

DCCF-related interfaces subject to 3GPP standardization include network function (NF) consumer-DCCF, DCCF-NF producer, DCCF-DA, NF consumer 3CA and NF producer-3PA. 3PA may re-use existing interfaces and services.

When the Data Source is an Operations, Administration and Management (OA&M) function, OA&M services as defined by SA WG5 are reused. The 3PA may alternatively be standalone or combined with the Data Source. A 3PA is not needed if the Data Source natively supports the message bus protocol. The 3CA may alternatively be standalone or combined with the Data Consumer. A 3CA is not needed if the Data Consumer natively supports the message bus protocol. The DA may alternatively be standalone or combined with the DCCF. A DA is not needed if the DCCF natively supports the message bus protocol.

The intended Consumer of Data Management Framework services is an Network Data Analytics Function (NWDAF) or an NF requesting analytics, but as with other NF services, nothing precludes other Consumers (e.g., NFs) from using it.

NWDAFs co-located with NFs can also be consumers of Data Management Framework services, thus avoiding duplicate data collection from the NFs, e.g. by co-located NWDAF and other NWDAFs.

Adaptors (e.g., 3CA, 3PA and DA) are not expected to be standardized by 3GPP, only the interface between 3GPP entities and the adaptors is under 3GPP scope.

The DCCF is a control-plane function that coordinates data collection and triggers data delivery to Data Consumers. A DCCF may support multiple Data Sources, Data Consumers, and Message Frameworks. However, to prevent duplicate data collection, each Data Source is associated with only one DCCF.

The DCCF provides the 3GPP defined Ndccf_DataExposure Service to Data Consumers (e.g., NWDAF), and uses the services of Data Sources (e.g., 3GPP NF) to obtain data. Figure 6.9.2.1-1 shows one DCCF for the 5GC. There can be multiple instances of the DCCF, e.g., for network slices, geographic regions where Data Sources reside or for different Data Source types. A DCCF needed by a Consumer can be discovered using the NRF as described below.

The DCCF is aware of the Data Sources it is coordinating. The NRF and UDM can provide the DCCF with the identity of 5GC Data Sources (e.g., an AMF serving a UE). The DCCF also hides Data Source life cycle events and changes of entity serving a UE from the Data Consumer. For example, if an NF Data Source that serves a UE changes because of a life-cycle event, the NRF may notify a DCCF that has previously subscribed to NRF event notifications. The DCCF may also use the UDM to learn the new (UE, NF) association, thus making the change of the NF serving a UE transparent to the Data Consumer.

If there is more than one DCCF, they may coordinate the collection and distribution of data for orthogonal sets of Data Sources. In this case a Data Consumer discovers the DCCF for the data it needs, and the DCCF and the Message Framework delivers the data from the proscribed set of Data Sources. If a DCCF cannot serve a request from a Data Consumer it may query the NRF to determine an acceptable DCCF and redirect the query accordingly.

DCCF is not intended to support aggregation of analytics data across multiple NWDAFs. However, the DCCF keeps track of Consumer Requests to the NWDAF "Data Source", and hence knows what analytics are being produced by an NWDAF. Therefore, the Data Management Framework can be used by a Consumer (which could be an NWDAF) that consumes (e.g. aggregates) analytics data from one or more NWDAF acting as a "Data Source" or from the Data Repository. The NWDAF acting as "Data Source" supplies Analytics output as "Data", using the services defined in TS 23.288 clause 7 (subscribe/notify), similar to any other NF.

The DCCF receives data requests from Data Consumers via the Ndccf_DataExposure service. A Data Consumer may be a NWDAF Analytics function (Rel-17 NWDAF) and the contents of the service requests are based on Rel-16 services (e.g., AMF or SMF event exposure). The DCCF service may provide additional functionality, for example to allow one request that requires multiple Data Sources (e.g., AMF and SMF), and allow formatting and processing of notifications according to conditions specified by the consumer as described in the bullet list below.

If the Data Source is not specified in the Data Request, the DCCF determines the Data Source that can provide the data requested by the Data Consumer (e.g., an event requested by the Data Consumer for NF event exposure). For example, if the request is for UE specific data, the DCCF may query the NRF/UDM/BSF to determine which NF instance is serving the UE, as described in TS 23.288 Table 6.2.2.1-2: *NF Services consumed by NWDAF to determine which NF instances are serving a UE.*

If the Data Source is specified in the Data Request (e.g., the data consumer is configured with the data sources), the DCCF checks whether the Data is already collected from the Data Source. If not, it will request the Data to the specified Data Source.

The DCCF checks if the Data Consumer is authorized to access DCCF services using the procedures specified in TS 23.501 clause 7.1.4 "Network Function Service Authorization".

The DCCF determines if the requested data is currently being produced by any Data Source and sent to the Messaging Framework. If the requested data is not being produced, a new subscription/request is sent towards the Data Source to trigger a new data collection and the DCCF then subscribes with the messaging framework for the Consumer to receive future notifications. Similarly, when the last Data Consumer of a specific data no longer wants data, the DCCF cancels data collection from the Data Source and from the messaging framework. This ensures that the Data Source is only producing the same data once when there are multiple Data Consumers and is not producing data that no Data Consumer needs.

The DCCF determines if data is already being collected by maintaining a record of the prior requests it has made for data (e.g., via a Nnf_EventExposure service offered by the Data Source). If parameters in a prior request for data match those that are needed in a subsequent request, the DCCF may determine that the requested data is already being collected. The DCCF may then subscribe with the messaging framework for the new Consumer to receive future notifications.

Formatting conditions and Processing instructions requested by Data Consumers via the Ndccf_DataExposure service may be passed to the Messaging Framework via the Nda_Data_Management Service. The 3CA may then accordingly send notifications to the consumer. Formatting conditions determine when a notification is sent to the Consumer. For example, formatting may include:

Notification Event clubbing (buffering and sending of several notifications in one message).

A Notification Time Window (e.g., notifications are buffered and sent between 2 and 3 AM).

Cross event reference-based notification (when a subscribing NF is subscribing to multiple events (e.g., event X and event Y) the notification for an Event-X is buffered and reported only when the Event-Y occurs).

Consumer triggered Notification.

Exact time-based Notification without the event (Data is reported at an exact time, irrespective of event occurs or not. Example: every 30 min).

Mathematical calculation based notification (e.g., Exponential time window: The first notification is sent after 5 min. The next notification is sent after 10 min, and the third is after 15 min, etc.).

Processing instructions allow summarizing of notifications at 3CA to reduce the volume of data reported from the 3CA to the Data Consumer. This is particularly useful when data from a Data Repository (historical data) is requested that comprises a large number of notifications. The type of processing is specified by the consumer and may result in joining the information from multiple notifications into a common report.

When the DCCF receives a request for historical data (e.g., an NWDAF requesting analytics previously generated by another NWDAF), the DCCF may trigger retrieval of the data from the Data Repository and make it available over the messaging framework.

The DCCF manages subscription requests and cancellations to the Messaging Framework on behalf of Data Consumers. The DCCF may use a native Messaging Framework protocol or alternatively a 3GPP defined protocol with an adaptor that translates to the Messaging Framework protocol (as depicted in the Figure 6.9.2-1).

If standalone 3PAs and 3CAs are used, the DCCF maintains the (NF, 3PA) and (NF, 3CA) associations.

For DCCF discovery, the DCCF registers with the NRF and is discovered by Consumers or the SCP using the registration and discovery procedures defined for the Network Function Service Framework in TS 23.502, clause 4.17. The DCCF profile in the NRF may specify: the slices (S-NSSAIs) that the DCCF supports, the Source Types that a DCCF coordinates, and the serving area (e.g., list of TAIs) containing Data Sources that the DCCF coordinates.

Source Type may correspond to an NF Type (e.g., SMF, AMF, etc.), or different domains (e.g., OA&M). Hence a Consumer or SCP may request or select a DCCF according to the type of information it is requesting, the network slices it supports and its serving area.

The Messaging Framework is not expected to be standardized by 3GPP. It contains Messaging Infrastructure that propagates event information and data (e.g., streaming and notifications) from Data Sources to Data Consumers. The Messaging Framework may support the pub-sub pattern, where data is published by producer adaptors (or data source if the data source natively supports the message bus protocol) and can be subscribed to by consumer adaptor (or data consumers if the data consumer natively supports the message bus protocol).

The Messaging Framework may support multiple event delivery mechanisms such as best effort or guaranteed delivery. For 3GPP purposes guaranteed delivery of events may be utilized.

The Messaging Framework may contain one or more Adaptors that translate between 3GPP defined protocols (e.g., Rel-16 Nnwdaf_AnalyticsSubscription_Notify) and a Data Forwarding Protocol not specified by 3GPP. The Messaging Framework adaptors maintain subscription information, including formatting conditions and processing instructions received by the DA.

The Adaptor on the Producer side (3PA) allows any Source Data (e.g., from Rel-16 OA&M or NF EventExposure) to be distributed via the framework without impact on the Data Source. The DCCF keeps track on the Adaptor instances. An Adaptor may be associated with specific NF types, manage one or more data Sources, and may be provisioned on the DCCF together with the sources it support. If the Messaging Framework directly supports 3GPP interfaces, Adaptors may not be required.

An example procedure is given in Figures 6.9.3-1 for Data Collection & Distribution for Event Notifications (Subscribe/Notify). The procedure illustrates how the DCCF manages Data Sources so data are produced only once and how the DCCF interacts with the messaging framework so data are distributed to all subscribed Data Consumers. The procedure applies for consumers and producers using 3CA and 3PA, i.e., all steps are within 3GPP remit.

Data handled by the messaging framework is associated with an identifier. The example procedure in figure 6.9.3-1 assumes that the Messaging Framework uses a Pub/Sub model based on "Data Tags" (which could for example be a "Topic" in some message framework protocols). The 3PA can publish to a "Data Tag" and a 3CA that wishes to receive the data subscribes to the "Data Tag". Other options can also be supported.

FIG. 2 illustrates a method for Data Collection & Distribution for Event Notifications (Subscribe/Notify). Referring to FIG. 2, the method is described with reference to operations 1-14.

1. Data Consumer-1 (e.g., NWDAF-1) sends a request for data to the DCCF. The message includes the Notification Target Address. The message may indicate whether the requested data should be sent to the Notification Target Address set to Data Consumer-1 and/or to other Consumers such as Data Repository. The Notification Correlation ID of the Consumer-1 is included in the request message and is used for notifications sent to Data Consumer-1 (e.g., in operation 8).

2. If the request is for UE data, the DCCF may query the UDM/NRF/BSF to determine the NF serving the UE.

3. The DCCF determines the Data Source (e.g., AMF-1) that can provide the data and checks that the requested data is not already being collected.

4. The DCCF controls the message bus and the adaptors so the notifications traverse the messaging framework. The subscription to the DA includes a Notification Correlation ID of the 3PA and the Notification Correlation ID for Data Consumer-1 as received in step 1. The DA may associate these with a messaging framework. The 3PA is provided with its Notification Correlation ID and the "Data Tag". The 3CA will be provided with the consumer's notification endpoint, the Notification_Correlation_ID of the Consumer and the "Data Tag". The 3CA may then subscribe to the "Data Tag" in the messaging framework.

5. The DCCF sends a subscription request to a NF producer acting as a data source. The subscription includes the notification endpoint and Notification Correlation ID of the 3PA that is acting as the receiver for the notifications.

6. The Data Source acknowledges the request

7. A Notification containing the Notification Correlation ID of the 3PA is sent to the 3PA after an event trigger at the Data Source. The 3PA publishes the data in the message framework. It may use the "Data Tag" associated with the Notification Correlation ID of the 3PA received in step 4.

8. When the data is published to the "Data Tag", the Messaging Framework makes it available to all subscribed 3CA. In this case the only subscriber is a 3CA serving consumer-1. This 3CA maps the "Data Tag" to the Notification Correlation ID of the Data Consumer received in Step 4 (which was originally provided by Data Consumer-1) and sends the notification to the notification endpoint of Data Consumer-1.

9. Data Consumer-2 (e.g., NWDAF-2) sends a request for the same Data. The message may indicate whether the requested data should be sent to Data Consumer-2, and/or to other Consumers such as Data Repository. The Notification Correlation ID of Consumer-2 is included for notifications sent to Data Consumer-2.

10. The DCCF determines that the requested data is already being collected from a Data Source (e.g., AMF-1) and retrieves 3PA ID and the Notification Correlation ID of the 3PA.

11. The DCCF sends a subscription request to the Messaging Framework indicating that there is a new subscriber of the data. The subscribe message to the DA provides the 3PA ID, the 3PA Notification Correlation ID currently in use, and the Notification Correlation ID for Data Consumer-2 as received in step 9. The DA selects the existing "Data Tag" corresponding to the 3PA information and sends the 3CA Consumer-2's notification endpoint, the Notification_Correlation_ID of Consumer-2 and the "Data Tag". The 3CA may then subscribe to the "Data Tag" in the messaging framework.

The 3CA for Consumer-2 may be different or the same from 3CA for Consumer-1.

12. After an event is triggered in the data source, a Notification is sent to the 3PA and 3PA publishes the data to the corresponding "Data Tag" on the Messaging Framework.

13-14. When the data is published to the "Data Tag", the Messaging Framework makes it available to the subscribed 3CAs. In this case the 3CAs serving consumer-1 and consumer-2 receive the data and send the notifications to the notification endpoints of Data Consumer-1 and Data Consumer-2 using the Notification Correlation ID of Consumer-1 and Consumer-2, respectively. A Data Repository also receives notifications if it has subscribed via the DCCF.

There currently exist certain challenges. For example, there is no protection of data against untrusted DCCF in the setting of no Messaging Framework. If the DCCF is untrusted, then it can send a malicious data request to the data producer as if it comes from a real data consumer and this may lead to information leakage to unauthorized entities.

SUMMARY

Certain aspects of the present disclosure and their embodiments may provide solutions to the above and/or other challenges. Certain embodiments protect collected data against untrusted DCCF if the data is collected from the data sources using DCCF framework without Messaging Framework. The NRF provides symmetric keys for encryption and integrity to protect the collected data. The NRF, then, sends the key pairs to the Data Consumer and Data Source using their public keys via the DCCF or directly.

Proposed herein are various embodiments that address one or more of the issues disclosed herein. Certain embodiments may provide one or more technical advantages, such as providing a security mechanism in case of an untrusted DCCF.

In some embodiments, a method performed by a data collection coordination function (DCCF) network node comprises receiving a request for data from a data consumer, determining a data source for the requested data, verifying with a network node that the data consumer and the DCCF network node are authorized by the data source, receiving a message container for the data consumer from the network node, the message container for the data consumer including a data encryption key $K_E$ and a data integrity key $K_I$, receiving a message container for the data source from the network node, the message container for the data source including the data encryption key $K_E$ and the data integrity key $K_I$, transmitting the message container for the data consumer to the data consumer; and transmitting the message container for the data source to the data source.

In some related embodiments, the method further comprises transmitting a subscription request to the data source, upon a triggering event, receiving data from the data source, wherein the data is protected by at least one of the data encryption key $K_E$ and the data integrity key $K_I$, and transmitting the received data to the data consumer.

In some related embodiments, the data encryption key $K_E$ and the data integrity key $K_I$ within the message container for the data consumer are encrypted using a public key of the data consumer.

In some related embodiments, the data encryption key $K_E$ and the data integrity key $K_I$ within the message container for the data source are encrypted using a public key of the data source.

In some related embodiments, the message container for the data consumer and the message container for the data source are each signed by a private key of the network node.

In certain embodiments, a DCCF network node comprises processing circuitry and memory collectively configured to receive a request for data from a data consumer, determine a data source for the requested data, verify with a network node that the data consumer and the DCCF network node are authorized by the data source, receive a message container for the data consumer from the network node, the message container for the data consumer including a data encryption key $K_E$ and a data integrity key $K_I$, receive a message container for the data source from the network node, the message container for the data source including the data encryption key $K_E$ and the data integrity key $K_I$, transmit the message container for the data consumer to the data consumer, and transmit the message container for the data source to the data source.

In some related embodiments, the processing circuitry and memory are further collectively configured to transmit a subscription request to the data source, upon a triggering event, receive data from the data source, wherein the data is protected by at least one of the data encryption key $K_E$ and the data integrity key $K_I$, and transmit the received data to the data consumer.

In some related embodiments, the data encryption key $K_E$ and the data integrity key $K_I$ within the message container for the data consumer are encrypted using a public key of the data consumer.

In some related embodiments, the data encryption key $K_E$ and the data integrity key $K_I$ within the message container for the data source are encrypted using a public key of the data source.

In some related embodiments, the message container for the data consumer and the message container for the data source are each signed by a private key of the network node.

In certain embodiments, a method of operating a network node comprises receiving a request to authorize a DCCF and a data consumer, upon successful authorization of the DCCF and the data consumer, generating and storing a data encryption key and a data integrity key, generating and sending, to the DCCF, a message container for the data consumer, the message container for the data consumer including the data encryption key and the data integrity key, and generating and sending, to the DCCF, a message container for a data source, the message container for the data source including the data encryption key and the data integrity key.

In some related embodiments, the data encryption key and the data integrity key within the message container for the data consumer are encrypted using a public key of the data consumer.

In some related embodiments, the data encryption key and the data integrity key within the message container for the data source are encrypted using a public key of the data source.

In some related embodiments, the message container for the data consumer and the message container for the data source are each signed by a private key of the network node.

In some related embodiments, the method further comprises, upon successful authorization of the DCCF and the data consumer, generating and sending, to the DCCF, an authorization token for the DCCF and an authorization token for the data consumer.

In certain embodiments, a network node comprises processing circuitry and memory collectively configured to receive a request to authorize a DCCF and a data consumer, upon successful authorization of the DCCF and the data consumer, generate and store a data encryption key and a data integrity key, generate and send, to the DCCF, a message container for the data consumer, the message container for the data consumer including the data encryption key and the data integrity key, and generate and send, to the DCCF, a message container for a data source, the message container for the data source including the data encryption key and the data integrity key.

In some related embodiments, the data encryption key and the data integrity key within the message container for the data consumer are encrypted using a public key of the data consumer.

In some related embodiments, the data encryption key and the data integrity key within the message container for the data source are encrypted using a public key of the data source.

In some related embodiments, the message container for the data consumer and the message container for the data source are each signed by a private key of the network node.

In some related embodiments, the processing circuitry and memory are further collectively configured to, upon successful authorization of the DCCF and the data consumer, generate and send, to the DCCF, an authorization token for the DCCF and an authorization token for the data consumer.

DETAILED DESCRIPTION

Some embodiments will now be described more fully with reference to the accompanying drawings. Other embodiments, however, are contained within the scope of the disclosed subject matter, and the disclosed subject matter should not be construed as limited to only the embodiments set forth herein; rather, these embodiments are provided by way of example to convey the scope of the subject matter to those skilled in the art.

Figure 1:
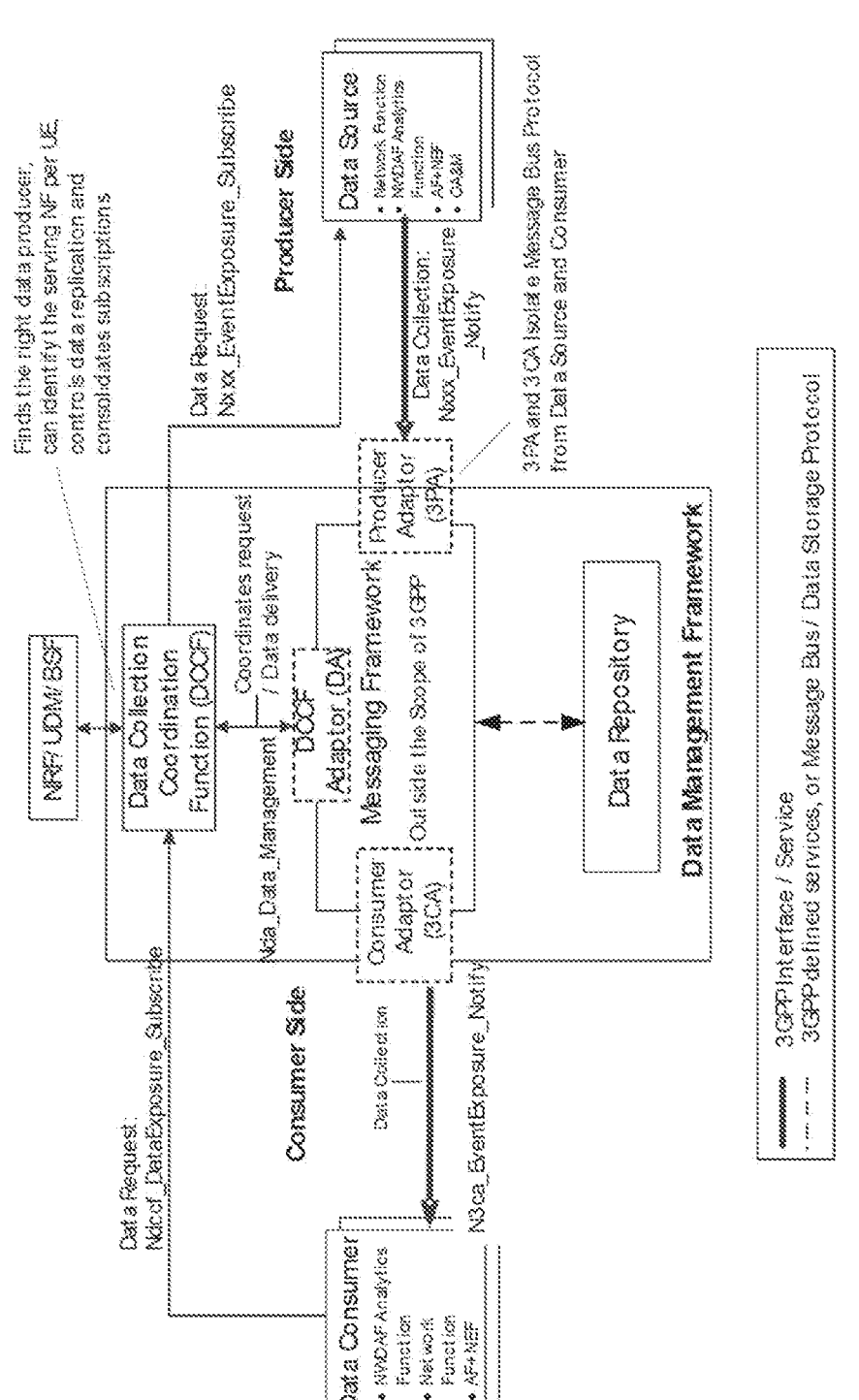
FIG. 1 illustrates an example Data Management Framework for 5GC.
Figure 2:
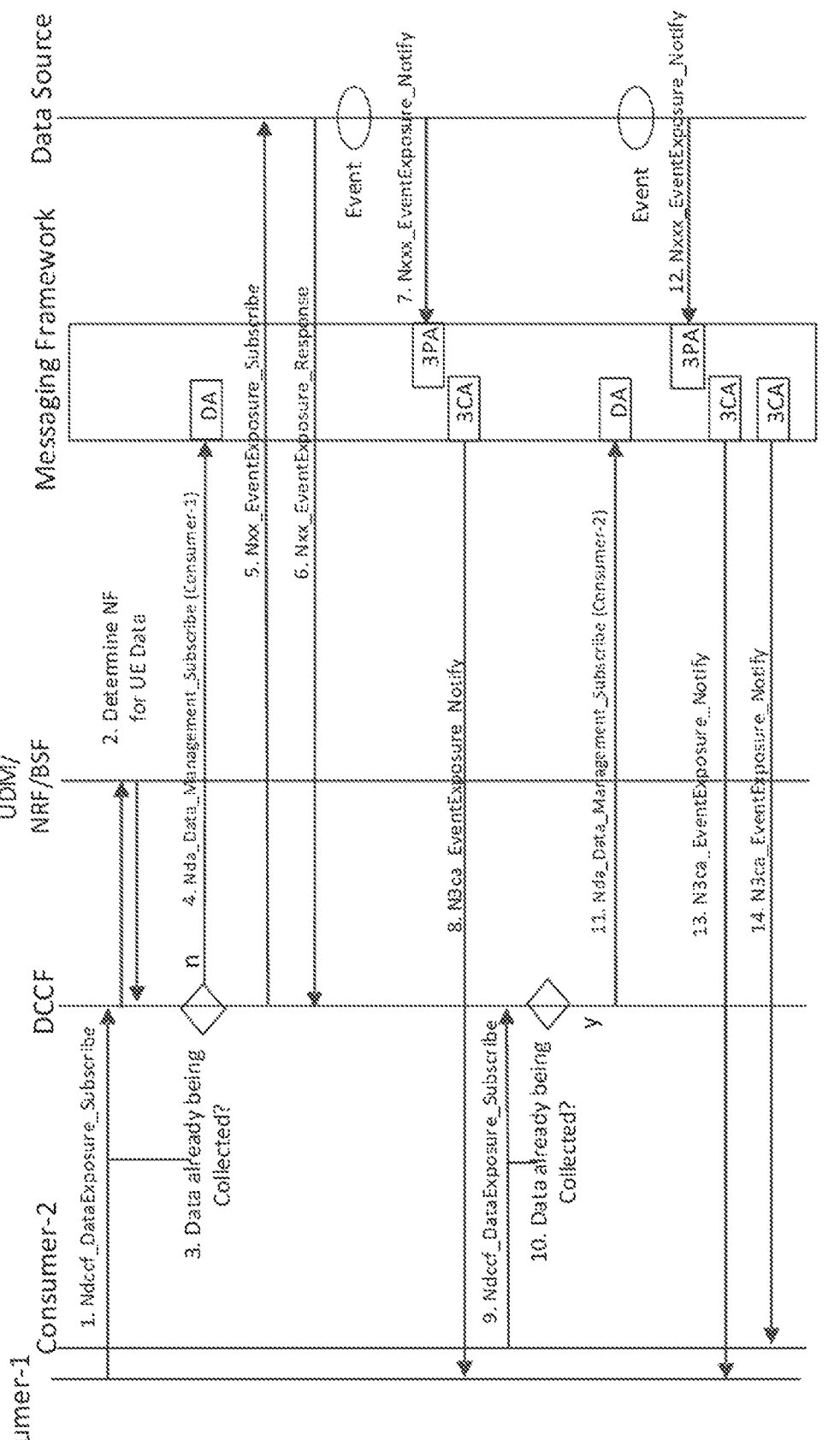
FIG. 2 illustrates a method for Data Collection & Distribution for Event Notifications (Subscribe/Notify).
Figure 3:
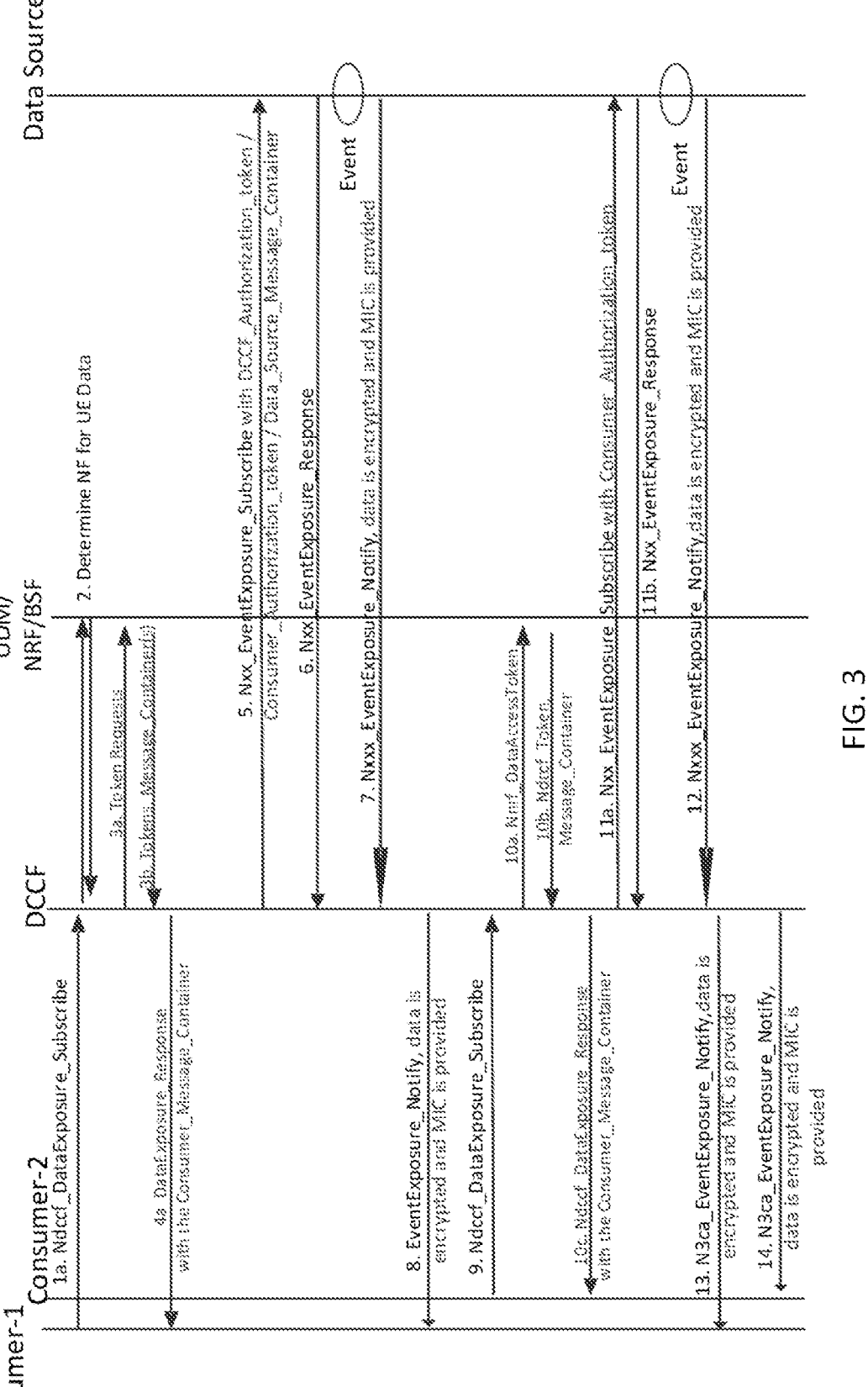
FIG. 3 is a flow diagram illustrating a method according to some embodiments.

FIG. 3 is a flow diagram illustrating a method according to some embodiments. The description of FIG. 3 uses the 3GPP, SA2 defined names of NFs, but these terms are general enough to cover any data coordination functionality (public or private) and authorization functionality in operator domain. The method of FIG. 3 is described with respect to operations 1-14 below.

1a. Data Consumer-1 (e.g., NWDAF-1) sends a request for data to the DCCF. The message includes the Notification Target Address. The message may indicate whether the requested data should be sent to the Notification Target Address set to Data Consumer-1 and/or to other Consumers such as Data Repository. The Notification Correlation ID of the Consumer-1 is included in the request message and is used for notifications sent to Data Consumer-1 (e.g., in step 8).

The Data Consumer-1 can request the Token/Message Container for itself for data collection from the NRF directly. In both cases that the Data Consumer-1 requests the Token/Message Container directly or via the DCCF, NRF can provide the keys directly to the Data Consumer-1 and the Data Source.

2. If the request is for UE data, the DCCF may query the UDM/NRF/BSF to determine the NF serving the UE.

3a. The DCCF requests access token for the determined Data Source from NRF on behalf of Data Consumer-1. Also, DCCF requests access token from the NRF for itself to authorize itself towards the Data Source.

To authorize the data consumers, it may not be necessary to request an access token from the NRF by the DCCF. The DCCF can query the authorization of the data consumer from the NRF and the NRF can reply the authorization result to the DCCF without providing any authorization token for the data consumers.

3b. The NRF performs authorization of the DCCF and Data Consumer-1. If authorization results are successful, the NRF generates and stores the data encryption and the data integrity keys for this data collection because the keys do not already exist for the requested data. Then the NRF generates and sends the following to the DCCF accordingly.

Authorization token for the DCCF (DCCF_Authorization_token),

Authorization token for Data Consumer-1 (Consumer_Authorization_token)

A message container for the Data Consumer-1 (Consumer_Message_Container), which includes the data encryption key $K_E$ and a data integrity key $K_I$ in encrypted form using the public key of the Data Consumer-1 and the key identifiers. This message container is signed by the NRF using its private key.

A message container for the Data Source (Data_Source_Message_Container), which includes the data encryption key $K_E$ and a data integrity key $K_I$ in encrypted form using the public key(s) of the Data Source(s) and the key identifiers, in the case that the $K_E$ and the $K_I$ have not been previously distributed to the Data Source(s). This message container is signed by the NRF using its private key.

Information that when the keys should be renewed or invalid. (Optional)

The NRF stores which data consumers access which data. In case of key updates, the NRF generates and sends message containers to DCCF, which includes new encrypted key pairs using public keys of data consumers and data sources. Then the DCCF distributes the message containers to the related data consumers and data sources.

4a. The DCCF sends the Consumer_Message_Container to the Data Consumer-1.

The NRF can send the Consumer_Message_Container to the Data Consumer-1 directly instead of sending via the DCCF. In this case, 4a will not be executed.

5. The DCCF sends a subscription request to a NF producer acting as a data source. The request also includes the DCCF_Authorization_token, Consumer_Authorization_token and the Data_Source_Message_Container.

The NRF can send the Data_Source_Message_Container to the Data Source directly instead of sending via the DCCF. In this case, the message container will not be included in the request and the following step will be executed: The NRF sends the Data_Source_Message_Container directly to the Data Source.

6. The Data Source acknowledges the request with a Subscription ID.

7. The Data Source sends the data to the DCCF after an event trigger at the Data Source. The data is encrypted using $K_E$. A MIC (Message Integrity Code) should also be included in the message. The $K_E$ and $K_I$ is retrieved by decrypting Data_Source_Message_Container.

8. The DCCF sends the encrypted data to the Data Consumer-1. When Data Consumer-1 receives the data, it will check the data integrity and decrypt the data using the key pairs sent by the NRF in the Consumer_Message_Container.

9. Data Consumer-2 (e.g., NWDAF-2) sends a request for the same type of data. The message may indicate whether the requested data should be sent to Data Consumer-2, and/or to other Consumers such as Data Repository. The Notification Correlation ID of Consumer-2 is included for notifications sent to Data Consumer-2.

10a. The DCCF requests access token for the determined Data Source from NRF on behalf of Data Consumer-2.

10b. The NRF performs authorization of Data Consumer-2. If authorization result is successful, the NRF fetches the keys for the requested data since the keys do already exist. Then the NRF generates and sends the following token and message container to the DCCF accordingly.

Authorization Token for Data Consumer-2 (Consumer_Authorization_Token)

(It may not be necessary to provide authorization token. The authorization result can be provided without any token.)

A message container for the Data Consumer-2 (Consumer_Message_Container), which includes the data encryption key $K_E$ and a data integrity key $K_I$ in encrypted form using the public key of the Data Consumer-2 and the key identifiers. This message container is signed by the NRF using its private key.

The NRF stores which data consumers access which data. In case of key updates, the NRF generates and sends message containers to DCCF, which includes new encrypted key pairs using public keys of data consumers and data sources. Then the DCCF distributes the message containers to the related data consumers and data sources.

10c. The DCCF sends the Consumer_Message_Container to the Data Consumer-2. The keys in the message container are the same as operation 2c, because Data Consumer-2 requests the same data as Data Consumer-1.

11a. The DCCF sends a subscription request to a NF producer acting as a data source. The request also includes the Consumer_Authorization_token.

11b. The Data Source acknowledges the request with a Subscription ID.

12. After an event is triggered in the data source, a Notification is sent to the DCCF. The confidentiality and integrity protection are done as in step 7.

13-14. The DCCF sends the encrypted data to the Data Consumer-1 and Data Consumer-2. When Data Consumers receive the data, they will check the data integrity and decrypt the data as done is operation 8.

When the NRF provides the key $K_E$ and key $K_I$, it also maintains a timer for renewing the keys. When NRF decides to renew the keys, it will send to the DCCF message containers with the new keys to be distributed to the subscribed data consumers and to the data source. Also, the NRF can decide to renew the keys when a new consumer requests for the same type of data. In this case, the NRF should distribute the new keys to the related consumers and producers via DCCF or directly.

In some embodiments, the Data Consumer-1 can request the Token/Message Container for itself for data collection directly from the NRF instead of requesting via DCCF. In such embodiments, the NRF may authorize the request and if the authorization result is successful, then the NRF generates and stores the data encryption and the data integrity keys for this data collection if they do not already exist, or the NRF fetches the keys if they do already exist. Then the NRF generates the access token and a signed message container that includes the key pair encrypted with the public key of Data Consumer-1. The NRF sends the token and the message container directly to the Data Consumer-1.

If the key pair has not been provided to the Data Source before, then the NRF also generates a signed message container that includes the same key pair but now encrypted with the public key of Data Source. The NRF sends the message container directly to the Data Source. The Data Consumer-1 sends the token to the DCCF for the authorization purposes.

Figure 4:
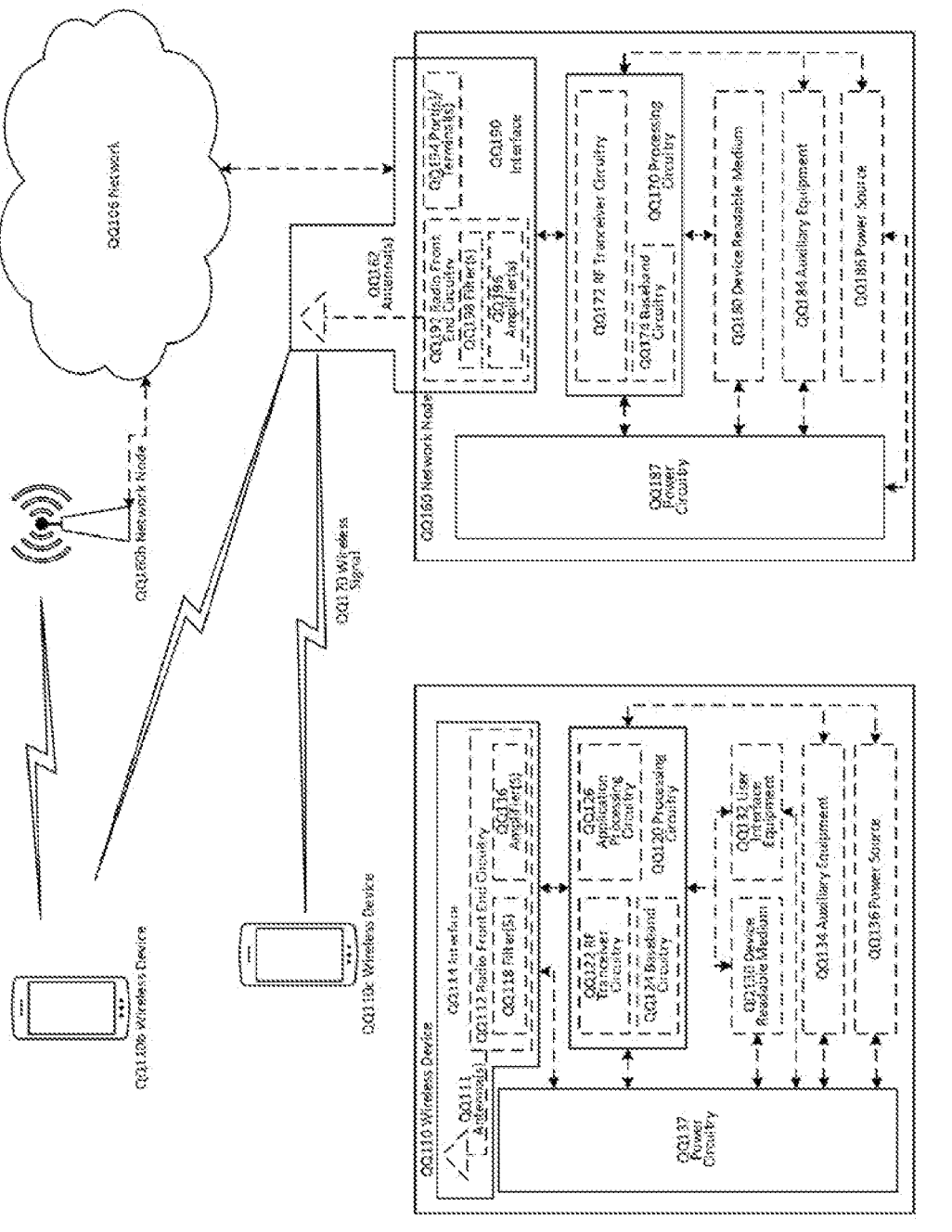
FIG. 4 illustrates a wireless network in accordance with some embodiments.

FIG. 4 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, some embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IOT) standard. Some examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
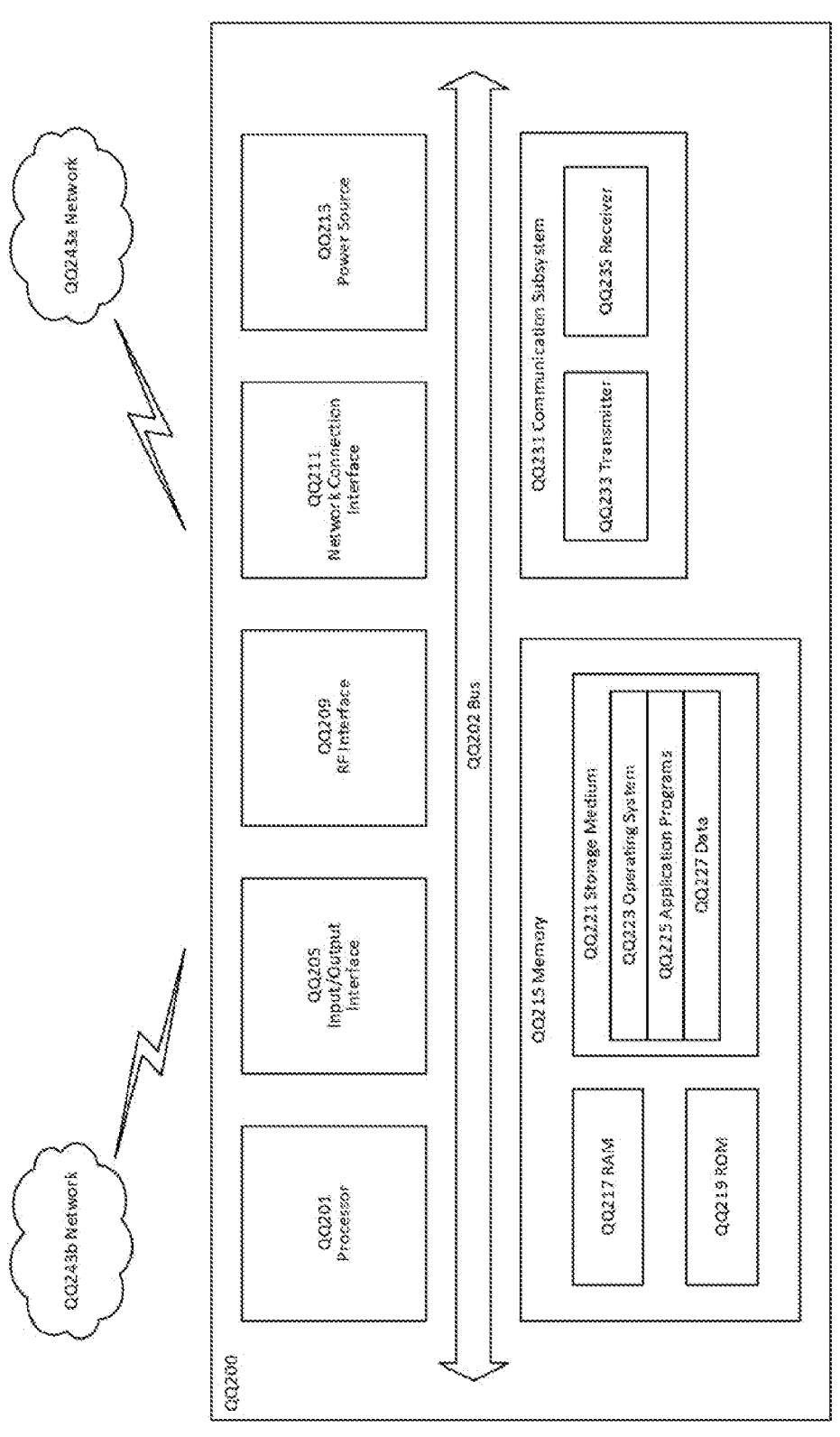
FIG. 5 illustrates one embodiment of a UE in accordance with some embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IOT UE, a machine type communication (MTC) UE, and/or an enhanced MTC (eMTC) UE. UE QQ200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 6:
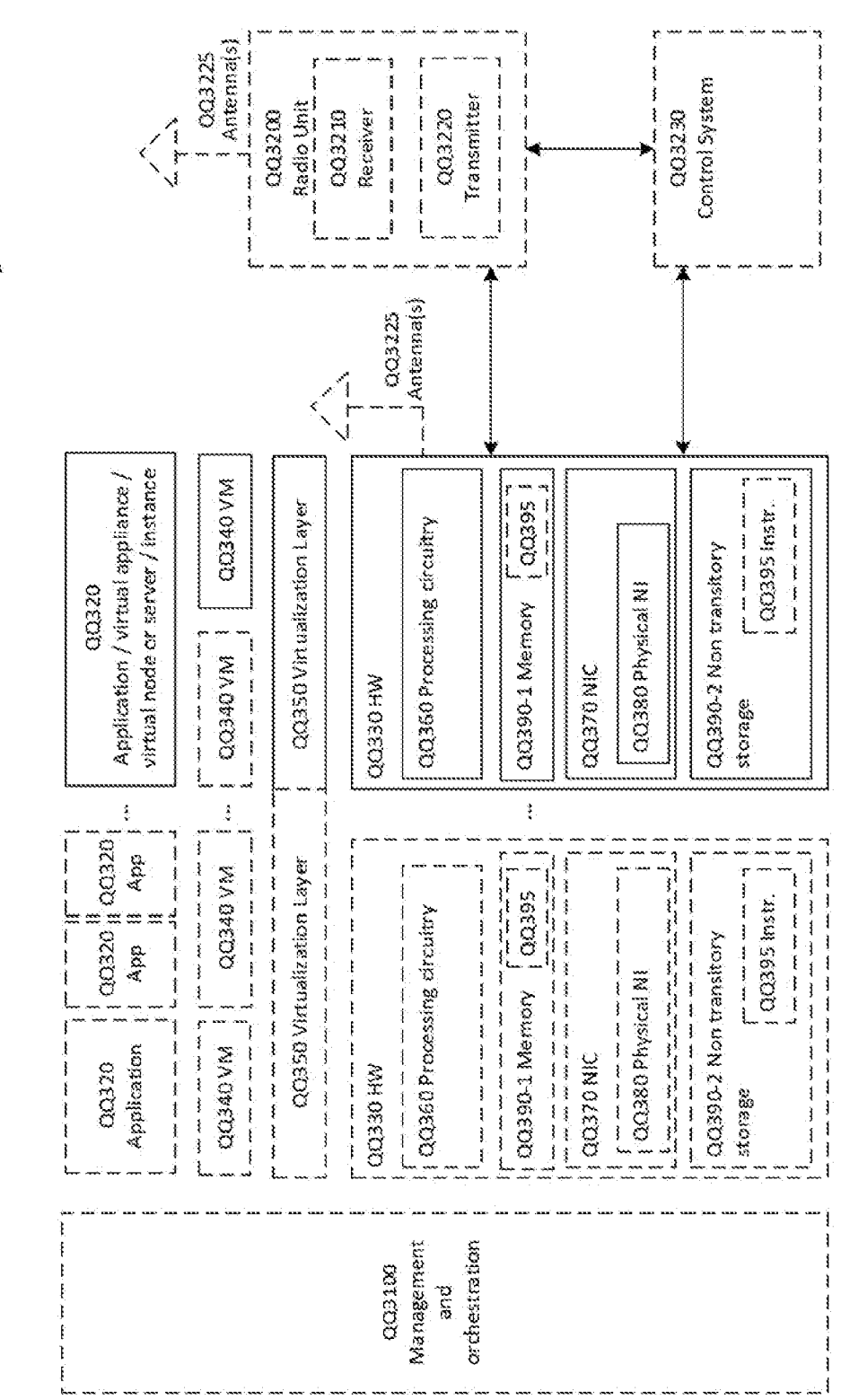
FIG. 6 is a schematic block diagram illustrating a virtualization environment in which functions implemented by some embodiments may be virtualized.

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 7:
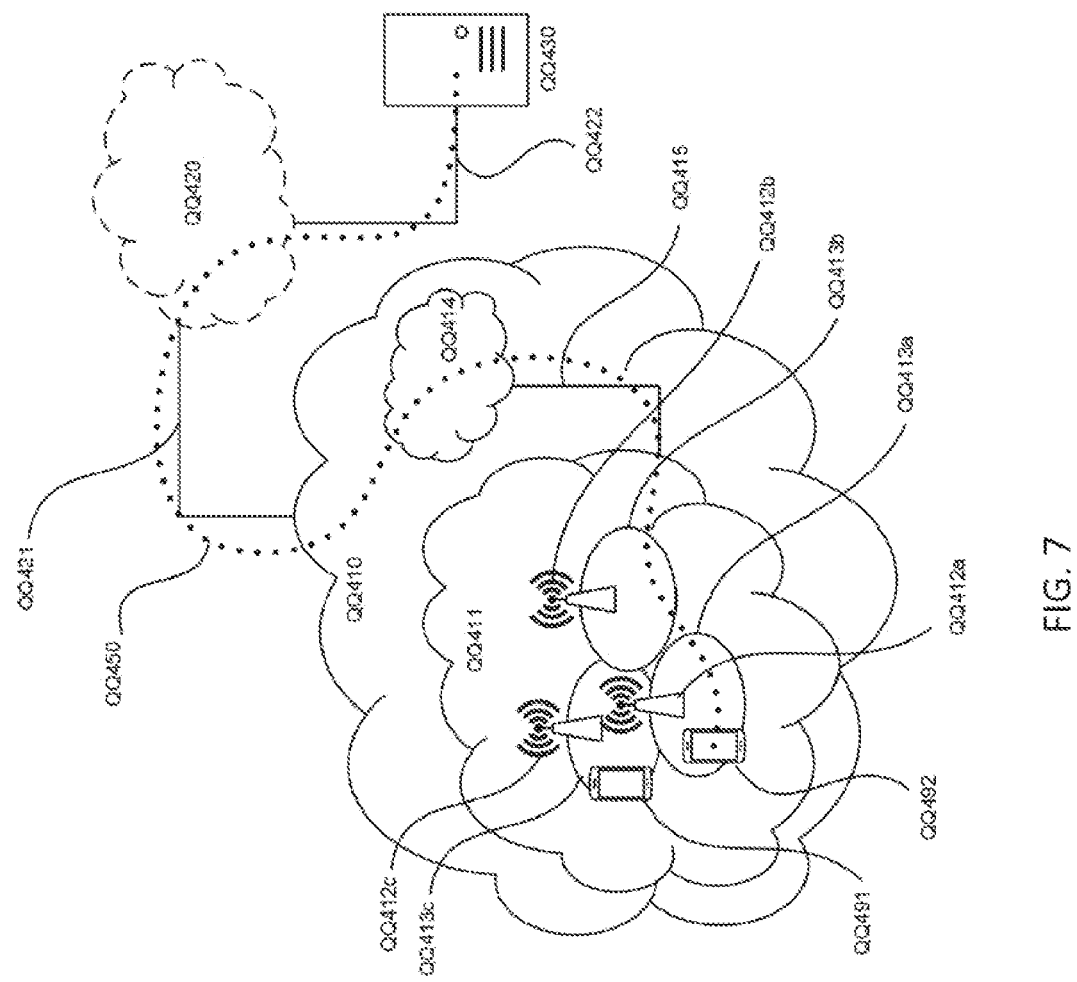
FIG. 7 illustrates a telecommunication network connected via an intermediate network to a host computer in accordance with some embodiments.

FIG. 7 illustrates a telecommunication network connected via an intermediate network to a host computer in accordance with some embodiments.

Referring to FIG. 7, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 7 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 8:
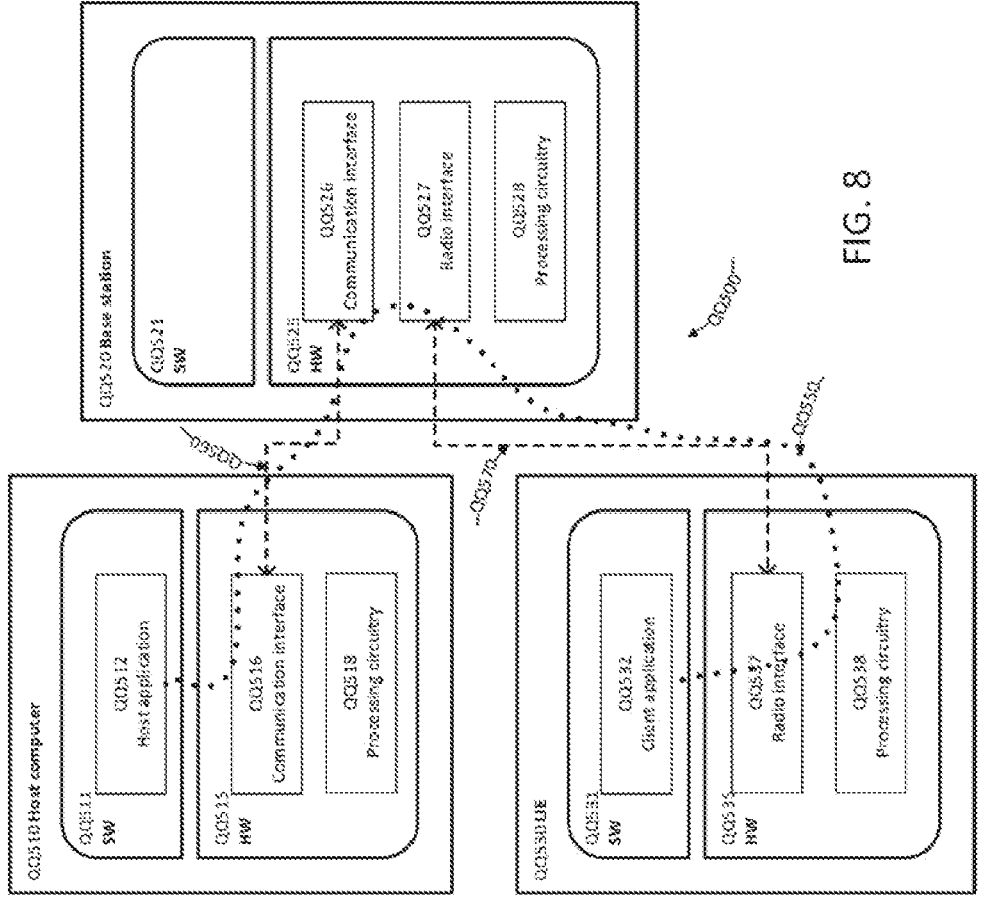
FIG. 8 illustrates a host computer communicating via a base station with a user equipment over a partially wireless connection in accordance with some embodiments.

FIG. 8 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 8) served by base station QQ520. Communication interface QQ526 may be configured to facilitate connection QQ560 to host computer QQ510. Connection QQ560 may be direct or it may pass through a core network (not shown in FIG. 8) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 8 may be similar or identical to host computer QQ430, one of base stations QQ412a, QQ412b, QQ412c and one of UEs QQ491, QQ492 of FIG. 7, respectively. This is to say, the inner workings of these entities may be as shown in FIG. 8 and independently, the surrounding network topology may be that of FIG. 7.

In FIG. 8, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 9:
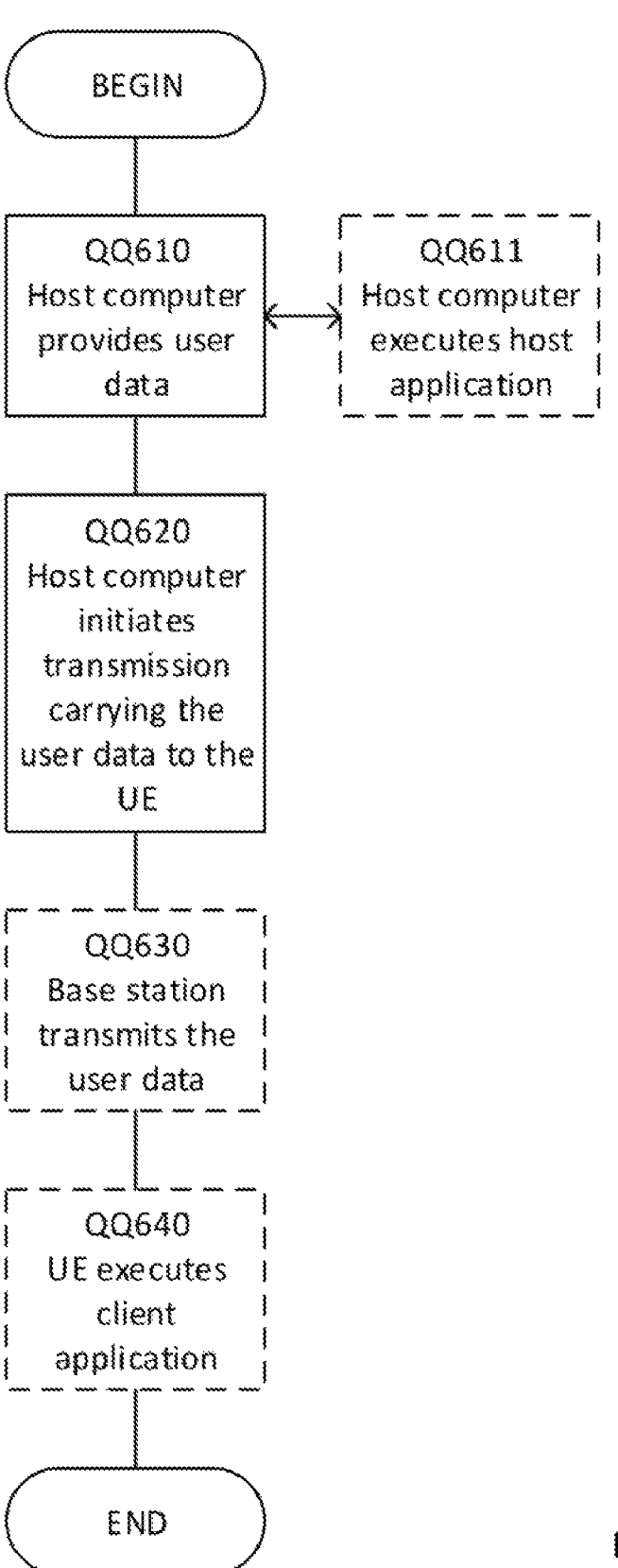
FIG. 9 is a flowchart illustrating a method implemented in a communication system, in accordance with some embodiments.

FIG. 9 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 9 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 10:
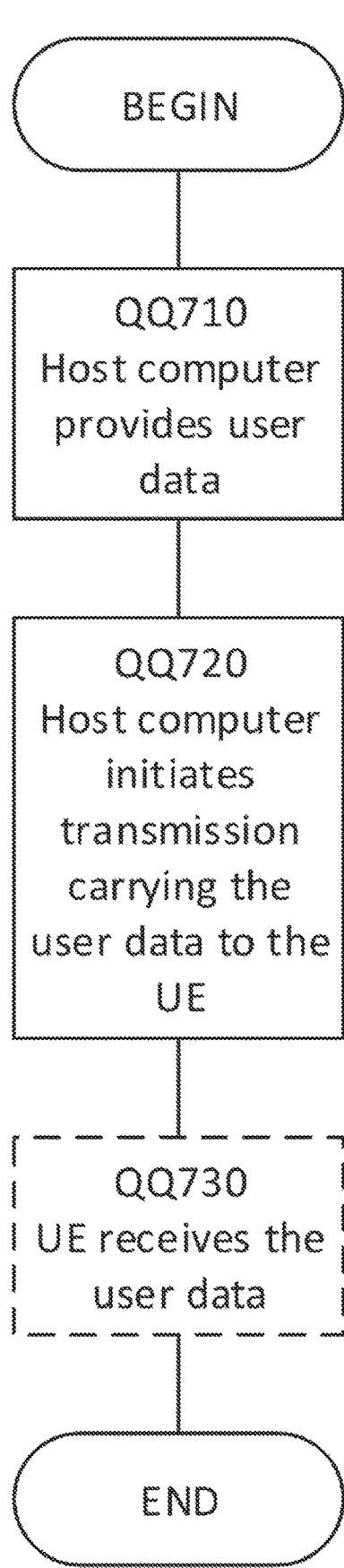
FIG. 10 is a flowchart illustrating a method implemented in a communication system, in accordance with some embodiments.

FIG. 10 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 10 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 11:
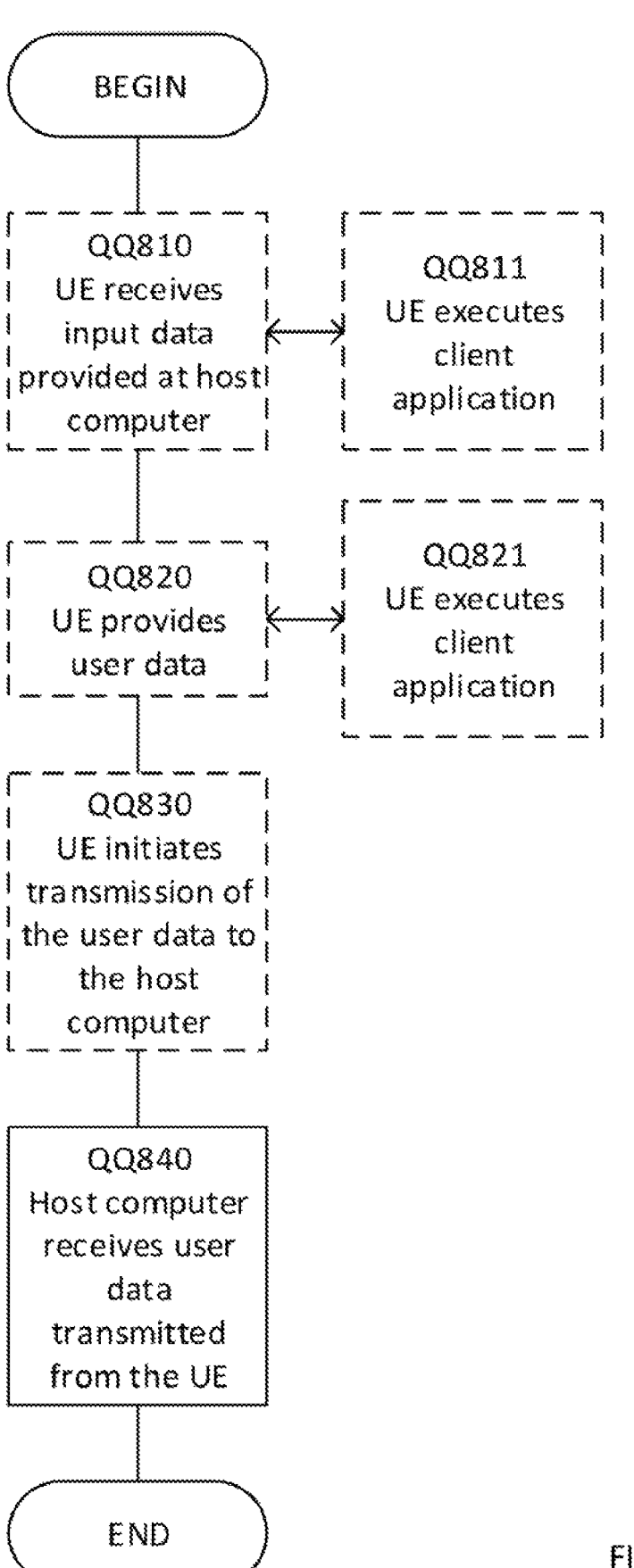
FIG. 11 is a flowchart illustrating a method implemented in a communication system, in accordance with some embodiments.

FIG. 11 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 11 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 12:
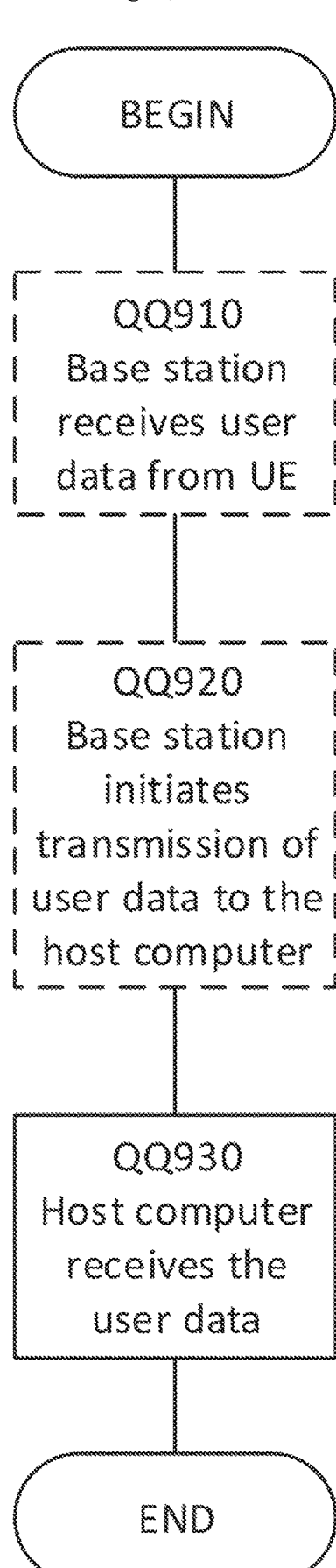
FIG. 12 is a flowchart illustrating a method implemented in a communication system, in accordance with some embodiments.

FIG. 12 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 12 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a Third Generation Partnership Project (3GPP) data collection coordination function (DCCF) network node, comprising:

receiving a request for data from a data consumer;

determining a data source for the requested data;

verifying with a network repository function (NRF) network node that the data consumer and the DCCF network node are authorized by the data source;

receiving a message container for the data consumer from the NRF network node, the message container for the data consumer including a data encryption key $K_E$ and a data integrity key $K_1$;

receiving a message container for the data source from the NRF network node, the message container for the data source including the data encryption key $K_E$ and the data integrity key $K_1$;

transmitting the message container for the data consumer to the data consumer; and transmitting the message container for the data source to the data source.

2. The method of claim 1, further comprising:

transmitting a subscription request to the data source;

upon a triggering event, receiving data from the data source, wherein the data is protected by at least one of the data encryption key $K_E$ and the data integrity key $K_I$; and transmitting the received data to the data consumer.

3. The method of claim 1, wherein the data encryption key $K_E$ and the data integrity key $K_1$ within the message container for the data consumer are encrypted using a public key of the data consumer.

4. The method of claim 1, wherein the data encryption key $K_E$ and the data integrity key $K_1$ within the message container for the data source are encrypted using a public key of the data source.

5. The method of claim 1, wherein the message container for the data consumer and the message container for the data source are each signed by a private key of the NRF network node.

6. A Third Generation Partnership Project (3GPP) data collection coordination function (DCCF) network node, comprising:

processing circuitry and memory collectively configured to:

receive a request for data from a data consumer;

determine a data source for the requested data;

verify with a network repository function (NRF) network node that the data consumer and the DCCF network node are authorized by the data source;

receive a message container for the data consumer from the NRF network node, the message container for the data consumer including a data encryption key $K_E$ and a data integrity key $K_1$;

receive a message container for the data source from the NRF network node, the message container for the data source including the data encryption key $K_E$ and the data integrity key $K_1$;

transmit the message container for the data consumer to the data consumer; and transmit the message container for the data source to the data source.

7. The DCCF network node of claim 6, wherein the processing circuitry and memory are further collectively configured to:

transmit a subscription request to the data source;

upon a triggering event, receive data from the data source, wherein the data is protected by at least one of the data encryption key $K_E$ and the data integrity key $K_I$; and transmit the received data to the data consumer.

8. The DCCF network node of claim 6, wherein the data encryption key $K_E$ and the data integrity key $K_I$ within the message container for the data consumer are encrypted using a public key of the data consumer.

9. The DCCF network node of claim 6, wherein the data encryption key $K_E$ and the data integrity key $K_I$ within the message container for the data source are encrypted using a public key of the data source.

10. The DCCF network node of claim 6, wherein the message container for the data consumer and the message container for the data source are each signed by a private key of the network node.

* * * * *